Dec. 18, 1934.  C. W. BRECHT  1,984,860
ICE CREAM UNIT FOR ELECTRIC REFRIGERATORS
Filed Oct. 2, 1931  2 Sheets-Sheet 1

Charles W. Brecht,
INVENTOR

BY Victor J. Evans & Co.
ATTORNEY

WITNESS:

Dec. 18, 1934.                 C. W. BRECHT                 1,984,860
              ICE CREAM UNIT FOR ELECTRIC REFRIGERATORS
                    Filed Oct. 2, 1931        2 Sheets-Sheet 2
*Fig. 3.*
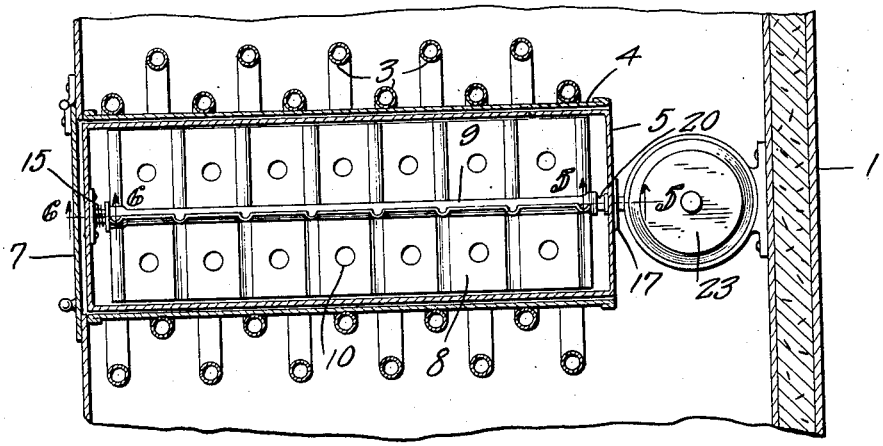
*Fig. 4.*  *Fig. 5.*
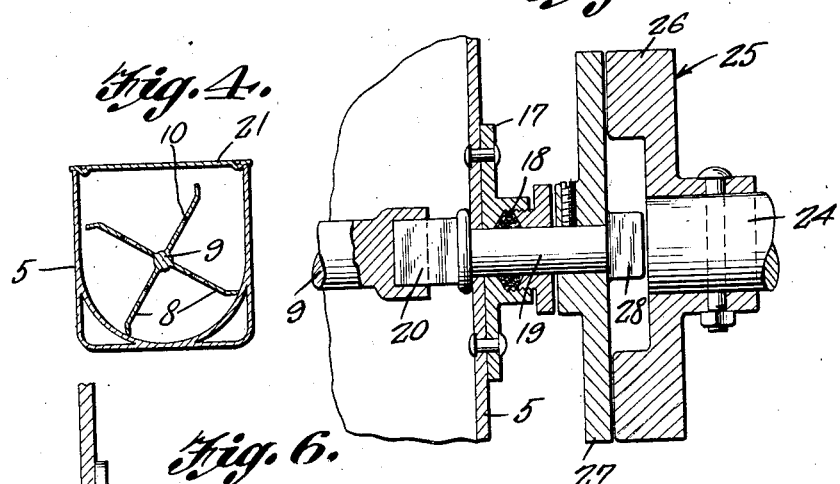
*Fig. 6.*
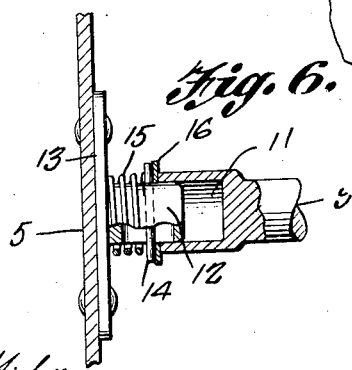
Charles W. Brecht,
INVENTOR
BY Victor J. Evans & Co.
ATTORNEY Patented Dec. 18, 1934

1,984,860

UNITED STATES PATENT OFFICE 1,984,860

ICE CREAM UNIT FOR ELECTRIC REFRIGERATORS

Charles W. Brecht, Pittsburgh, Pa.

Application October 2, 1931, Serial No. 566,540

1 Claim. (Cl. 259—110)

This invention relates to freezing units for refrigerators for domestic and similar purposes and is especially adaptable for freezing foods or ice cream and has for the primary object, the provision of a device of the above stated character which may be conveniently installed in a conventional type of refrigerator by taking the place of the ordinary freezing unit and is so constructed that the food being frozen may receive agitation to prevent freezing into ice particles and thus produce a frozen food of a smooth and non-icy consistency.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary front elevation illustrating a refrigerator with a freezing unit applied thereto and constructed in accordance with my invention.

Figure 3 is a sectional view taken on the line 3—3 of Figure 2.

Figure 4 is a transverse sectional view illustrating the agitator within the food container.

Figure 5 is a detail sectional view taken on the line 5—5 of Figure 3.

Figure 6 is a sectional view taken on the line 6—6 of Figure 3.

Figure 1:
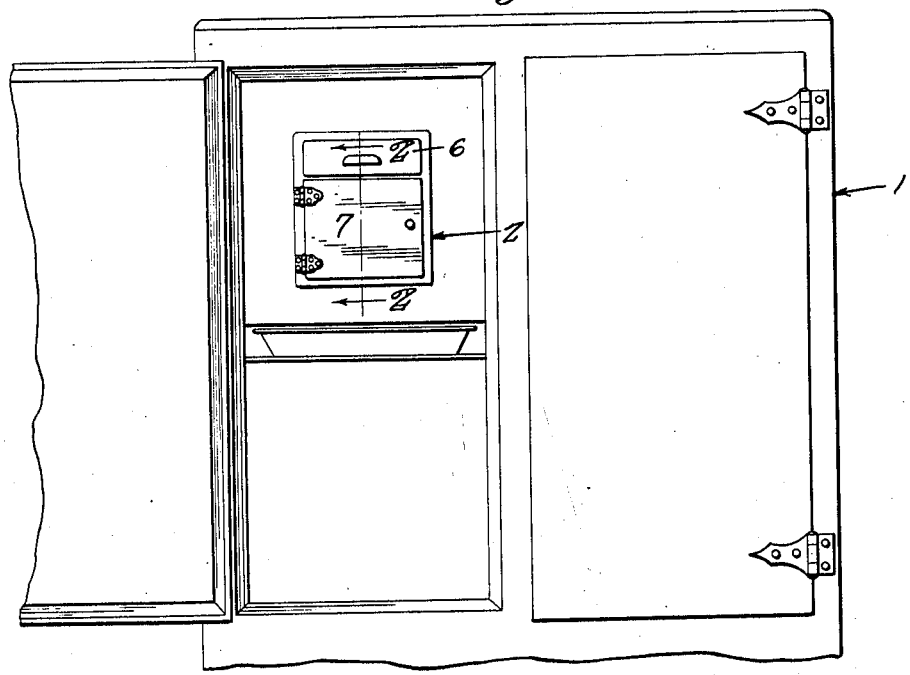
Figure 2:
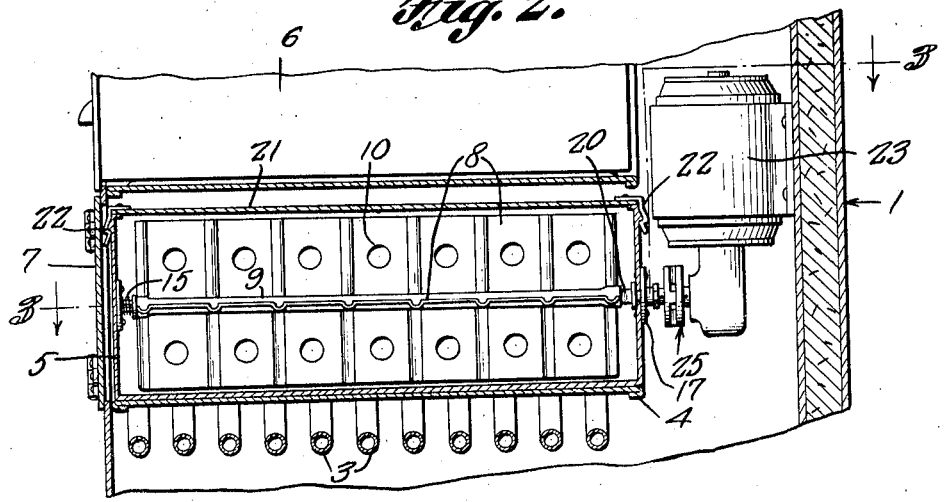
Figure 2 is a sectional view taken on the line 2—2 of Figure 1.

Referring in detail to the drawings, the numeral 1 indicates a conventional type of electrically operated refrigerator and 2 indicates the freezing unit constructed in accordance with my invention and applied to the refrigerator. The unit 2 includes the usual coils 3 surrounding a casing 4 adapted to receive containers 5 and 6. The container 6 is of the usual tray type especially designed for freezing water into cubes of ice while the container 5 is designed to receive food ingredients to be frozen into ice cream or the like. Each end of the casing 4 is opened to receive the containers 5 and 6 and the ends of said casing are closed thereby. The container 6 at the front end thereof is provided with the usual handle.

The front end of the casing 4 is provided with a hinged door 7 for closing that end of the casing occupied by one end of the container 5.

The container 5 has journalled therein an agitator 8 including a shaft 9 provided with a plurality of radially extending apertured blades 10, the free ends of which are angularly disposed as shown in Figure 4. The shaft 9 is provided with socketed ends 11 and one of the sockets is of cylindrical formation while the other socket is provided with internal angularly disposed faces. The cylindrical socket 11 receives a pintle 12 carried by a bracket 13 secured to one of the end walls of the container. The pintle 12 is provided with a slot in which operates a pin 14 engaged by an expansion spring 15. A washer 16 is interposed between the end of the shaft 9 and the pin 14, thus it will be seen that one end of the shaft is rotatably and yieldably mounted within the container 5. The other end of the container 5 is provided with a journal 17 having a stuffing box 18 to rotatably support a shaft 19. One end of the shaft 19 extends into the container 5 and is provided with a squared end 20 removably received within the squared socket 11 of the shaft 9, thus it will be seen that the agitator will be rotated by the shaft 19 and also that the agitator can be easily and quickly removed from the container 5 when desired. The container 5 is closed by a removable cover 21 held against accidental displacement by spring catches 22.

An electric motor 23 is mounted in the rear of the refrigerator 1 and the drive shaft 24 thereof is detachably connected to the shaft 19 by a coupling 25. The coupling 25 comprises disks 26 and 27 which are secured to the shafts 24 and 19 respectively and have formed upon their opposing faces lugs 28 adapted to engage with each other to establish a detachable driving connection between the shafts 24 and 19. It is to be understood that the electric motor 23 receives its electrical supply in any suitable way and is conveniently controlled.

From the foregoing description it will be seen that by setting the electric motor 16 in operation, the food ingredients placed within the container 5 will be thoroughly agitated during their freezing process to prevent the ingredients from becoming icy or containing particles of ice thereby producing frozen food of a smooth consistency. After the food ingredients have been frozen, the container may be easily removed from the casing and also the agitator removed therefrom, and the container placed within the refrigerator for maintaining the frozen food ingredients for a desired length of time. After the container 5 has been removed from the casing 4 other containers or trays not shown may be substituted in the casing in lieu thereof.

While I have shown and described the preferred embodiment of my invention, it will be understood that minor changes in construction, combination and arrangement of parts may be made without departing from the spirit and scope of my invention, as claimed.

Having thus described my invention, what I claim is:

The combination with an electric refrigerator having a freezing unit therein, said freezing unit having a compartment therein, of a removable container in said compartment, an agitator element removably mounted in said container, said agitator element having a shaft thereon, means on one end wall of said container for resiliently and rotatably supporting one end of said shaft, a shaft carried by the other end wall of the container, said shaft and the agitator shaft being so arranged as to form a severable driving connection therebetween, a driving motor mounted in the refrigerator independent of said container, said motor having a drive shaft, and means for effecting a readily severable driving connection between the motor shaft and the shaft carried by the end wall of the container.

CHARLES W. BRECHT.